United States Patent
Kwon et al.

(10) Patent No.: US 10,268,317 B2
(45) Date of Patent: Apr. 23, 2019

(54) APPARATUS FOR SENSING TOUCH PRESSURE UTILIZING ONE OR MORE PHOTO DETECTORS

(71) Applicant: Samsung Display Co., Ltd., Yongin-si (KR)

(72) Inventors: Jae Joong Kwon, Yongin-si (KR); Yun Seon Do, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 15 days.

(21) Appl. No.: 15/655,605

(22) Filed: Jul. 20, 2017

(65) Prior Publication Data

US 2018/0024694 A1    Jan. 25, 2018

(30) Foreign Application Priority Data

Jul. 22, 2016   (KR) .......................... 10-2016-0093589

(51) Int. Cl.
*G06F 3/042*    (2006.01)
*G06F 3/041*    (2006.01)

(52) U.S. Cl.
CPC .......... *G06F 3/0421* (2013.01); *G06F 3/0416* (2013.01); *G06F 2203/04105* (2013.01)

(58) Field of Classification Search
CPC .......... G06F 3/042; G06F 2203/04109; G06F 3/0487; G06F 2203/04105
See application file for complete search history.

(56) References Cited

U.S. PATENT DOCUMENTS

| | | | |
|---|---|---|---|
| 2014/0168153 A1* | 6/2014 | Deichmann | G06F 3/044 345/174 |
| 2015/0177909 A1* | 6/2015 | Hoffman | G06F 3/042 345/175 |
| 2016/0103544 A1 | 4/2016 | Filiz et al. | |

\* cited by examiner

*Primary Examiner* — Sanghyuk Park
(74) *Attorney, Agent, or Firm* — H.C. Park & Associates, PLC

(57) ABSTRACT

An apparatus for sensing a touch pressure includes a display panel configured to display images, a window located on the display panel, the window including a display area and a non-display area at the outside of the display area, a first sensor disposed to align with the non-display area, the first sensor including a first optical filter and a first photo detector configured to generate a first sensing value corresponding to an intensity of light transmitted through the first optical filter from the display panel, and a controller configured to calculate a magnitude of a touch pressure based on the first sensing value.

19 Claims, 3 Drawing Sheets

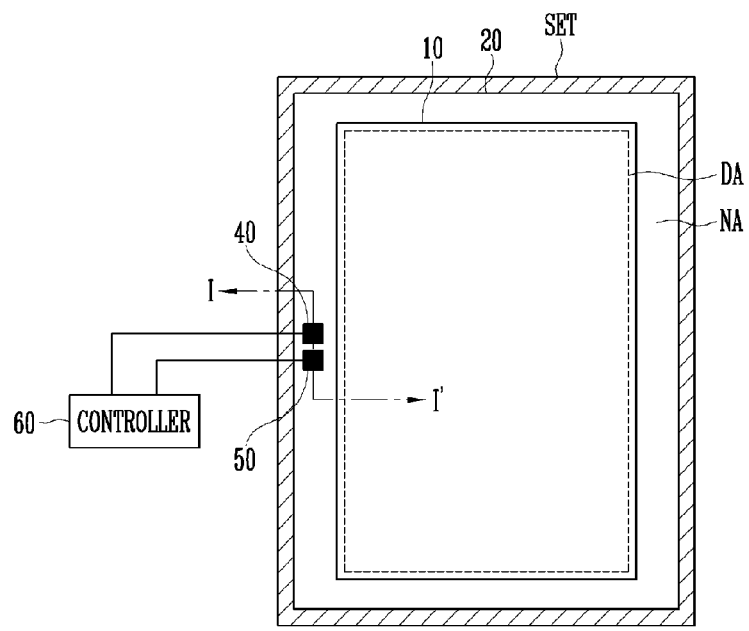
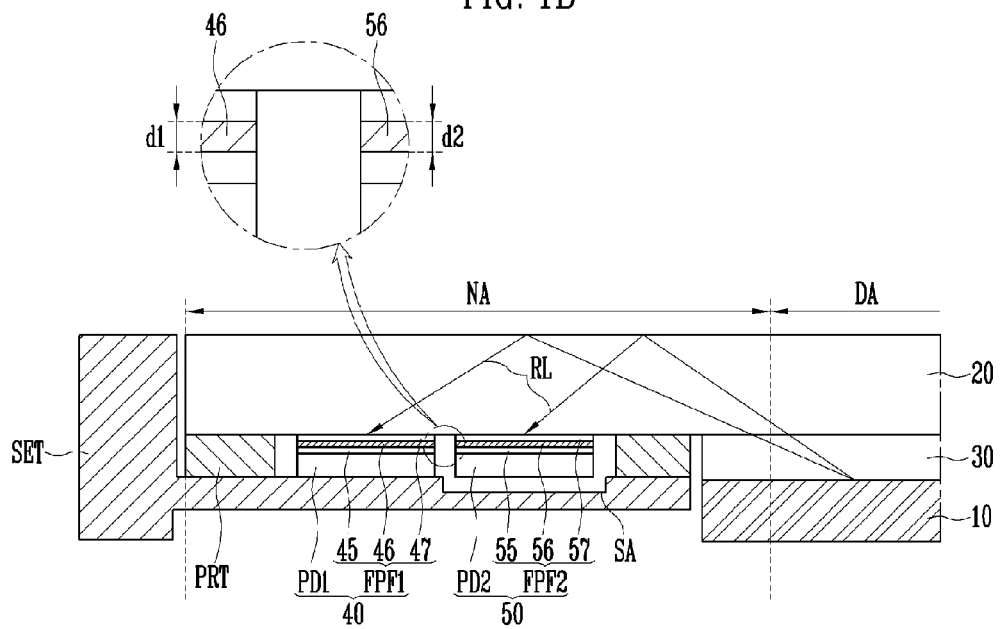

APPARATUS FOR SENSING TOUCH PRESSURE UTILIZING ONE OR MORE PHOTO DETECTORS

CROSS-REFERENCE TO RELATED APPLICATION

This application claims priority from and the benefit of Korean Patent Application No. 10-2016-0093589, filed on Jul. 22, 2016, which is hereby incorporated by reference for all purposes as if fully set forth herein.

BACKGROUND

Field

Exemplary embodiments relate to an apparatus for sensing a touch pressure.

Discussion of the Background

A touch sensing apparatus is an input apparatus that enables a command of a user to be input on a screen of a display panel or the like with a finger of the user or an object. Since such a touch sensing apparatus can be substituted for a separate input apparatus, such as a keyboard or mouse connected to a display device, its application fields have been gradually extended.

As the touch sensing apparatus is steadily developed, the touch sensing apparatus may be provided with not only a function of sensing a touch position but also a function of sensing a touch pressure.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide an apparatus for sensing touch pressure.

Additional features of the invention will be set forth in the description which follows, and in part will be apparent from the description, or may be learned by practice of the invention.

Exemplary embodiments disclose an apparatus including a display panel configured to display images, a window located on the display panel, the window including a display area and a non-display area at the outside of the display area, a first sensor disposed to align with the non-display area, the first sensor including a first optical filter and a first photo detector configured to generate a first sensing value corresponding to an intensity of light transmitted through the first optical filter from the display panel, and a controller configured to calculate a magnitude of a touch pressure based on the first sensing value.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIG. 1A is a plan view schematically illustrating an apparatus for sensing a touch pressure according to an exemplary embodiment of the present disclosure.

FIG. 1B is a partial sectional view of the apparatus taken along line I-I' of FIG. 1A.

DETAILED DESCRIPTION OF THE ILLUSTRATED EMBODIMENTS

Figure 2A:
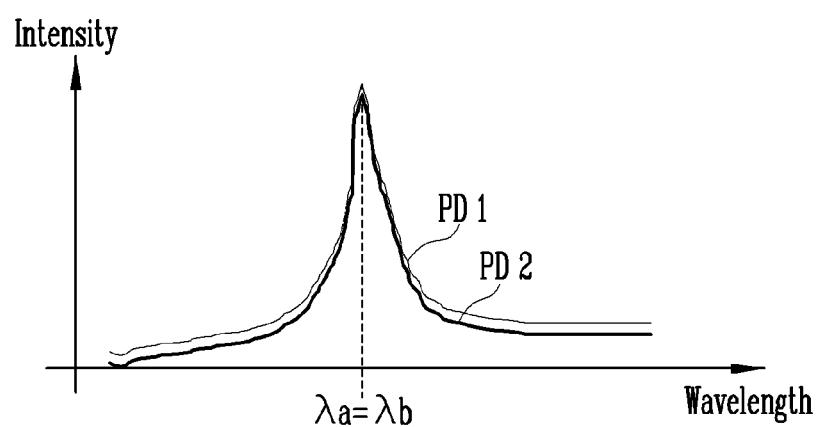
FIGS. 2A and 2B are views illustrating variation of the wavelength band of transmitted light transmitted through the first optical filter.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein Hereinafter, exemplary embodiments of the present disclosure will be described in detail with reference to the accompanying drawings.

FIG. 1A is a plan view schematically illustrating an apparatus for sensing a touch pressure according to an exemplary embodiment of the present disclosure. FIG. 1B is a partial sectional view of the apparatus taken along line I-I' of FIG. 1A.

Referring to FIGS. 1A and 1B, the apparatus according to the exemplary embodiment of the present disclosure may include a display panel 10, a window 20, a touch sensor 30, a first sensor 40, a second sensor 50, a controller 60, and a set unit SET.

The display panel 10 may display images. At this time, light emitted from the display panel 10 may have a wavelength having a certain band. The display panel 10 may be a flexible display panel entirely or partially having flexibility. In this exemplary embodiment, the display panel 10 may be an organic light emitting display panel. Various examples known in the art may be applied as the display panel 10, and a separate description of the display panel 10 will be omitted.

The window 20 may be located on the display panel 10, and include a display area DA and a non-display area NA at the outside of the display area DA. The display area DA may be an area in which images are displayed, and simultaneously, may be set as a touch active area in which a touch input is possible. The non-display area may be a light shielding area of an opaque color, e.g., a black color, which is formed along an edge of the display area DA, and may have a shape surrounding the display area DA in which images are displayed.

The window 20 is located at a front surface of the apparatus, and may be formed using a transparent material such as glass, polyethylene terephthalate (PET), or acryl. The window 20 may reflect light (reflected light RL) toward the non-display area NA. Specifically, some light emitted from the display panel 10 may be reflected at an interface between the window 20 and air. In order to guide the reflected lights RL, the display panel 10 and the window 20 may be adhered closely to each other, or the display panel 10, the window 20, and the touch sensor 30 may be adhered closely to each other. No air gap may exist between the display panel 10 and the window 20, or between the display panel 10, the window 20, and the touch sensor 30.

The touch sensor 30 may be located between the display panel 10 and the window 20. The touch sensor 30 may be configured in any one type among a resistive type, a capacitive type, a surface acoustic wave type, and an infrared type to sense a touch position.

In an exemplary embodiment, the touch sensor 30 may be of an integrated type with the display panel 10, and sensing electrodes (not shown) may be formed on an upper substrate (not shown) of the display panel 10. In another exemplary embodiment, the sensing electrodes of the touch sensor 30 may be formed on a separate touch substrate (not shown). In addition, the touch sensor 30 and the display panel 10 may be coupled to each other by an adhesive member (not shown).

The first sensor 40 may be disposed corresponding to the non-display area NA, and may include a first optical filter FPF1 and a first photo detector PD1 that may generate a first sensing value corresponding to an intensity of light transmitted through the first optical filter FPF1. The second sensor 50 may be adjacent to the first sensor 40, and may include a second optical filter FPF2 and a second photo detector PD2 that generates a second sensing value corresponding to an intensity of light transmitted through the second optical filter FPF2.

The first sensor 40 and the second sensor 50 may be disposed under the window 20. The first photo detector PD1 and the second photo detector PD2 may detect an intensity of light having the same wavelength band. The first sensing value may be a value corresponding to the intensity of light transmitted through the first optical filter FPF1, and the second sensing value may be a valve corresponding to the intensity of light transmitted through the second optical filter FPF2.

The first sensor 40 and the second sensor 50 may be located in the same layer as a printing layer PRT located under the window 20. A portion of the printing layer PRT may be removed to expose the first sensor 40 and the second sensor 50 therethrough. That is, the printing layer PRT may be formed except an area in which the first sensor 40 and the second sensor 50 are located. The printing layer PRT may be formed using an opaque colored material through a selected technique among a printing technique, a shadow mask technique, and a photolithography technique.

In this exemplary embodiment, the first sensor 40 and the second sensor 50 may be located at one side of the non-display area NA. In another embodiment, the first sensor 40 and the second sensor 50 may form a pair such that a plurality of pairs may be distributed and disposed in the non-display area. For example, the first and second sensors 40 and 50 may be disposed at four sides of the non-display area NA.

The first sensor 40 may have a structure in which the first optical filter FPF1 is stacked on the first photo detector PD1, and the second sensor 50 may have a structure in which the second optical filter FPF2 is stacked on the second photo detector PD2.

The first optical filter FPF1 may be located between the window 20 and the first photo detector PD1. The first optical filter FPF1 may be configured with a plurality of layers, and transmit only light having a certain wavelength band. At least one of the layers may have a thickness changed by a touch pressure, and a wavelength band of transmitted light transmitted through the layers may be changed.

In an exemplary embodiment, the first optical filter FPF1 may be a Fabry-Perot filter in which high and low refractive materials are alternately stacked. The first optical filter FPF1 may include a first layer 45, a second layer 46, and a third layer 47. Here, the first layer 45 and the third layer 47 may be metal thin films having the same material and thickness. The second layer 46 may be located between the first layer 45 and the third layer 47, and may be made of a material having a predetermined dielectric constant.

In addition, a thickness of the second layer 46 may be changed by a touch pressure applied onto the window 20. If the thickness of the second layer 46 is changed, a wavelength band of transmitted light transmitted through the first optical filter FPF1 may be changed.

In addition, the wavelength band of the transmitted light may be determined according to the material constituting the second layer 46. The second layer 46 may be made of any one of silicon dioxide ($SiO_2$), calcium oxide (CaO), magnesium oxide (MgO), cerium oxide ($CeO_2$), and yttrium oxide ($Y_2O_3$).

The second optical filter FPF2 may include a first layer 55, a second layer 56, and a third layer 57. The structures and materials of the first optical filter FPF1 and the second optical filter FPF2 may be substantially the same, and therefore, a detailed description of the second optical filter FPF2 will be omitted.

The set unit SET may be a quadrangular case structure for accommodating the window 20, the first sensor 40, and the second sensor 50 therein. A portion of the set unit SET may support the first sensor 40, and another portion of the set unit SET may be spaced apart from the second sensor 50. To this end, the set unit SET may include a recessed part SA formed as an area corresponding to the second sensor 50. The recessed part SA may have a size and a shape, which correspond to those of the second sensor 50.

In this exemplary embodiment, the set unit SET may have a structure provided along an edge of the apparatus, but the present disclosure is not limited thereto. In another exemplary embodiment, the set unit SET may have a structure including a bottom surface on which the display panel 10 is mounted The controller 60 may calculate a magnitude of a touch pressure, based on the first sensing value and the second sensing value. Here, the first sensing value may be changed corresponding to the touch pressure, and the second sensing value may become a reference value constantly maintained regardless of the touch pressure.

Specifically, in a state in which the touch pressure is not generated, a first thickness d1 of the second layer 46 of the first optical filter FPF1 may be equal to a second thickness d2 of the second layer 56 of the second optical filter FPF2. Therefore, the first sensing value may be equal to the second sensing value. Here, the first thickness d1 and the second thickness d2 may be simultaneously changed at the same rate by ambient temperature or other elements.

When the touch pressure is generated, a pressure is applied to the first sensor 40, and therefore, the first thickness d1 may be changed. However, since the second sensor 50 may be spaced part from the set unit SET by the recessed part SA, the second thickness d2 may be not changed but constantly maintained. Therefore, a difference between the first sensing value and the second sensing value exists. In particular, the controller 60 may calculate a thickness variation value corresponding to the difference between the first sensing value and the second sensing value with reference to preset reference values, and determine a magnitude of the touch pressure, which corresponds to the thickness variation value.

In another exemplary embodiment, the apparatus may be configured with only the first sensor 40 without the second sensor 50. Here, the controller 60 may calculate a thickness variation value corresponding to the first sensing value with reference to the preset reference values, and determine a magnitude of the touch pressure, which corresponds to the thickness variation value.

Figure 2B:
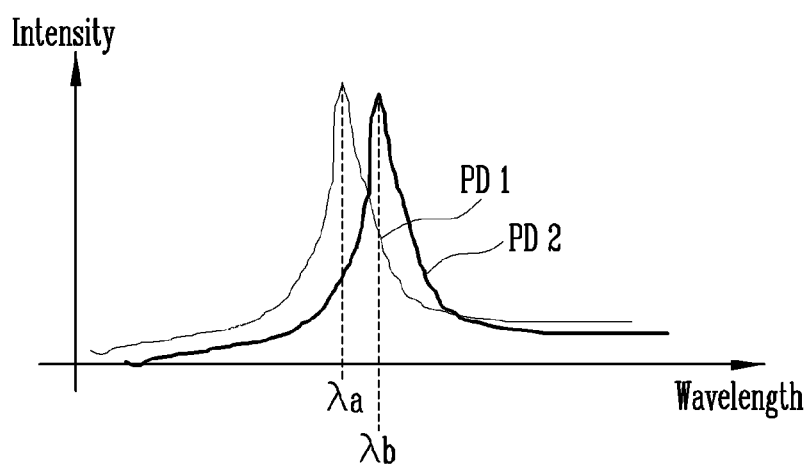

FIGS. 2A and 2B are views illustrating variation of the wavelength band of transmitted light transmitted through the first optical filter.

Referring to FIG. 2A, in the state in which the touch pressure is not generated, a first thickness d1 of the second layer 46 of the first optical filter FPF1 may be equal to a second thickness d2 of the second layer 56 of the second optical filter FPF2. In this case, a center wavelength $\lambda$a of the wavelength band of the transmitted light transmitted through the first optical filter FPF1 is equal to a center wavelength $\lambda$b of the wavelength band of the transmitted light transmitted through the second optical filter FPF2. Therefore, the first sensing value detected by the first photo detector PD1 may be equal to the second sensing value detected by the second photo detector PD2.

Referring to FIG. 2B, if the touch pressure is generated, a pressure may be applied to the first sensor 40, and therefore, the first thickness d1 may be changed. However, since the second sensor 50 may be spaced part from the set unit SET, the second thickness d2 may not be changed but constantly maintained. In this case, the center wavelength $\lambda$a of the wavelength band of the transmitted light transmitted through the first optical filter FPF1 may be varied (e.g., shifted lower), and the center wavelength $\lambda$b of the wavelength band of the transmitted light transmitted through the second optical filter FPF2 may be constantly maintained. Therefore, a difference between the first sensing value detected by the first photo detector PD1 and the second sensing value detected by the second photo detector PD2 exists.

Figure 3A:
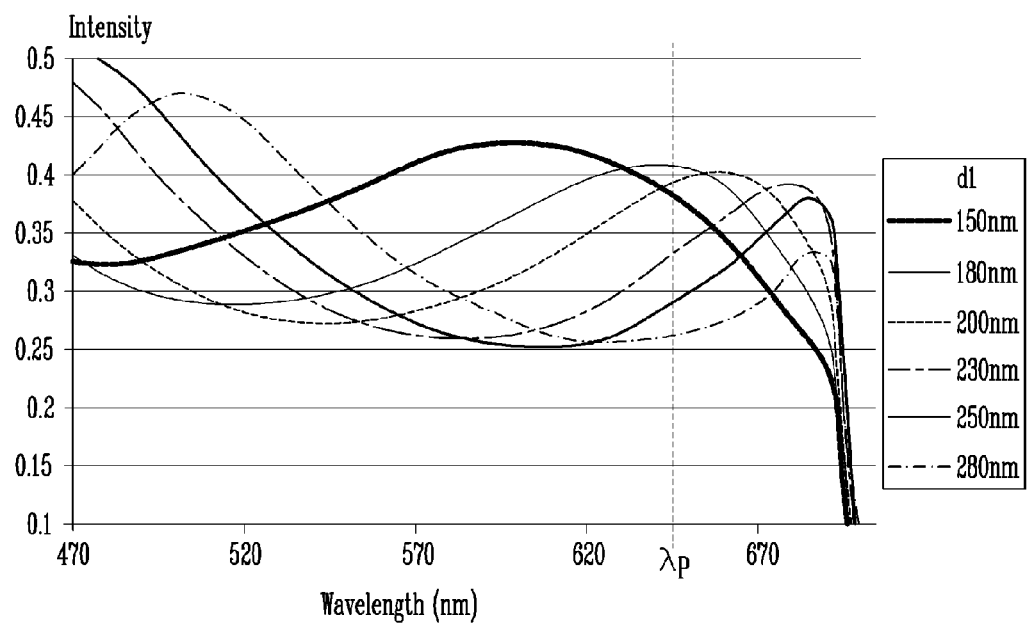
FIGS. 3A and 3B are views illustrating change in intensity of transmitted light with respect to change in thickness of the first optical filter.
Figure 3B:
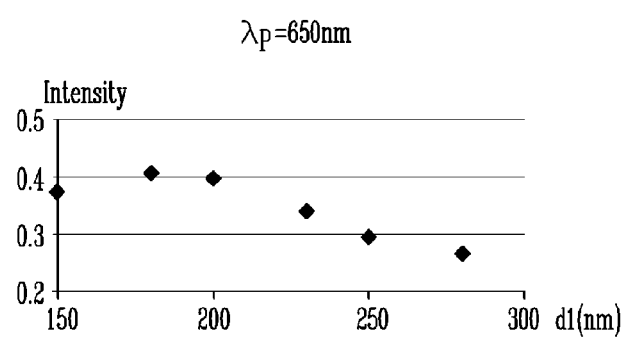

FIGS. 3A and 3B are views illustrating change in intensity of transmitted light with respect to change in thickness of the first optical filter.

Referring to FIG. 3A, a spectra of intensities of transmitted light transmitted through the first optical filter FPF1 through a simulation experiment in which the first thickness d1 of the second layer 46 of the first optical filter FPF1 is illustrated. A sensing wavelength $\lambda$p of a specific band, which is to be detected by the first photo detector PD1, may be previously set. The second photo detector PD2 represents the same spectra as the first photo detector PD1, and a sensing wavelength of the second photo detector PD2 may be identically set.

Referring to FIG. 3B, intensities of the transmitted light, which correspond to changes in first thickness d1 of the second layer 46 of the first optical filter FPF1, when the sensing wavelength $\lambda$p detected by the first photo detector PD1 is 650 nm are illustrated. The first photo detector PD1 may output the first sensing value that is a value corresponding to the intensity of the transmitted light transmitted through the first optical filter FPF1. Here, the intensities of the transmitted light, which correspond to the changes in first thickness d1 of the second layer 46 of the first optical filter FPF1, may be previously set to reference values.

The second photo detector PD2 may output the second sensing value that is a value corresponding to the intensity of the transmitted light transmitted through the second optical filter FPF2. The second thickness d1 of the second layer 56 of the second optical filter FPF2 may be constantly maintained, and the second sensing value may become a reference value that is constantly maintained regardless of the touch pressure.

The controller 60 may calculate a thickness variation value corresponding to the difference between the first sensing value and the second sensing value with reference to the preset reference values, and determine a magnitude of the touch pressure, which corresponds to the thickness variation value.

For example, when the first sensing value is 0.4 and the second sensing value is 0.3, it is determined that, with reference to the preset reference values, the first thickness d1 corresponds to the first sensing value is 200 nm and the second thickness d2 corresponds to the second sensing value is 250 nm. Therefore, the thickness variation value corresponding to the difference between the first sensing value and the second sensing value may be calculated as 50 nm. In addition, the controller 60 may determine a magnitude of the touch pressure, which corresponds to the thickness variation value. Here, the magnitude of the touch pressure, which corresponds to the thickness variation value, may be previously set to reference values by experimental data.

As described above, according to the present disclosure, a magnitude of a touch pressure is calculated by sensing an intensity of transmitted light of an optical filter, which is changed corresponding to the touch pressure, so that it is possible to an apparatus for sensing a touch pressure, which has high sensitivity.

The controller 60 and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like. In this manner, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. As such, the controller 60 and/or one or more components thereof may include or otherwise be associated with one or more memories (not shown) including code (e.g., instructions) configured to cause the controller 60 and/or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire, and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CDRW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. An apparatus comprising:
   a display panel configured to display images;
   a window disposed on the display panel, the window comprising:
      a display area, and
      a non-display area outside the display area;
   a first sensor overlapping with the non-display area, the first sensor comprising:
      a first optical filter, and
      a first photo detector configured to generate a first sensing value corresponding to an intensity of light transmitted through the first optical filter from the display panel;
   a second sensor adjacent to the first sensor, the second sensor comprising:
      a second optical filter, and
      a second photo detector configured to generate a second sensing valve corresponding to an intensity of light transmitted through the second optical filter from the display panel; and
   a set unit having the first sensor mounted thereon, the set unit being spaced apart from the second sensor; and
   a controller configured to calculate a magnitude of a touch pressure based on the first sensing value and the second sensing value.

2. The apparatus of claim 1, wherein the first optical filter comprises a plurality of layers having different refractive indices.

3. The apparatus of claim 2, wherein:
   in response to the touch pressure, at least one of the plurality layers of the first optical filter is configured to change in thickness, and
   in response to the change in the thickness, the first photo detector is configured to detect a change in a wavelength band of the light transmitted through the plurality of layers of the first optical filter.

4. The apparatus of claim 3, wherein the first optical filter is a Fabry-Perot filter.

5. The apparatus of claim 1, wherein the first optical filter is disposed between the window and the first photo detector.

6. The apparatus of claim 1, wherein the second optical filter has a same material and structure as the first optical filter.

7. The apparatus of claim 1, wherein the controller is configured to:
   calculate a thickness variation value corresponding to a difference between the first sensing value and the second sensing value with reference to preset reference values, and
   determine the magnitude of the touch pressure based on the thickness variation value.

8. The apparatus of claim 1, wherein the first and second photo detectors are configured to detect an intensity of light having a same wavelength band.

9. The apparatus of claim 1, wherein the first and second sensors are disposed under the window.

10. The apparatus of claim 1, wherein the first and second sensors are disposed in a same layer as a printing layer.

11. The apparatus of claim 10, wherein a portion of the printing layer is removed to expose the first and second sensors.

12. The apparatus of claim 1, wherein:
the first and second sensors form one of a plurality of sensor pairs, and
the plurality of sensor pairs is distributed and arranged in the non-display area.

13. The apparatus of claim 1, wherein the set unit comprises a recessed part formed as an area corresponding to the second sensor.

14. The apparatus of claim 1, wherein the light transmitted from the display panel is reflected off the window before being transmitted through at least one of the first and second sensors.

15. The apparatus of claim 1, wherein the display panel is a flexible display panel.

16. The apparatus of claim 1, further comprising:
a touch sensor disposed between the display panel and the window.

17. An apparatus comprising:
a display panel configured to display an image;
a window disposed on the display panel, the window comprising:
a display area, and
a non-display area adjacent to the display area;
a first sensor overlapping with the window, the first sensor comprising:
an optical filter contacting the non-display area of the window, and
a photo detector configured to generate a sensing value based on detection of light through the optical filter, a path of the light comprising a portion associated with the display area of the window; and
a controller configured to determine a magnitude of pressure applied to the apparatus based on the sensing value.

18. An apparatus comprising:
a display panel configured to display an image;
a window disposed on the display panel, the window comprising:
a display area, and
a non-display area adjacent to the display area;
a sensor overlapping with the non-display area, the sensor comprising:
an optical filter configured to change in thickness in response to pressure applied to the window, and
a photo detector configured to generate a sensing value corresponding to the thickness based on detection of light through the optical filter, a path of the light comprising a portion overlapping with the display area;
a controller configured to determine a magnitude of the pressure based on the sensing value; and
a touch sensor disposed directly between the window and the display panel such that the touch sensor contacts each of the window and the display panel.

19. The apparatus of claim 18, wherein the controller is configured to:
determine a thickness variation value corresponding to the sensing value with reference to one or more preset reference values, and
determine the magnitude of the touch pressure based on the thickness variation value.

* * * * *